June 5, 1923.
L. A. WAILES
1,458,014
SELF REGISTERING SCALE FOR FISHING RODS
Filed April 11, 1921
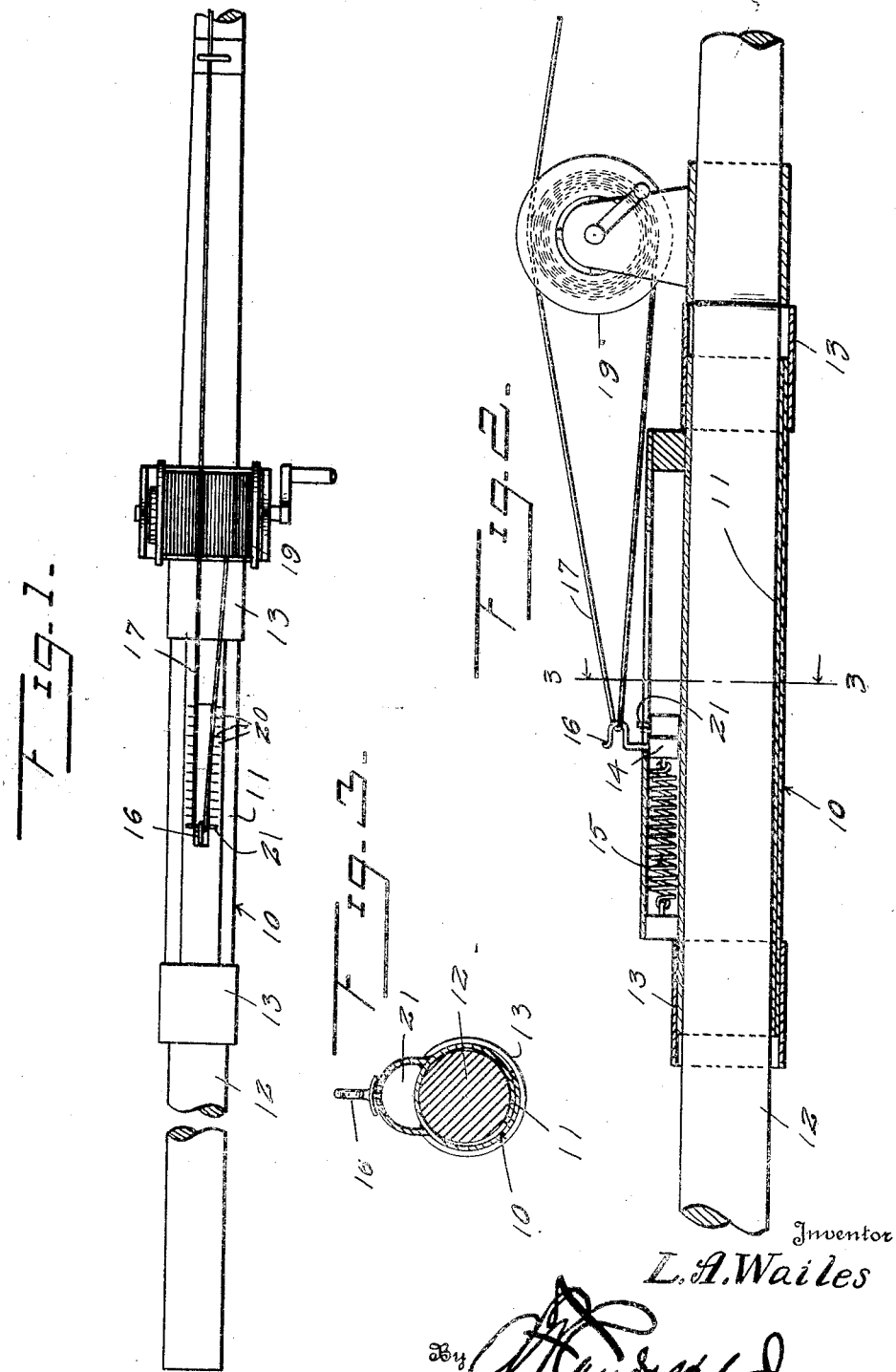
Inventor
L. A. Wailes Patented June 5, 1923.

1,458,014

UNITED STATES PATENT OFFICE.

LEONARD A. WAILES, OF NEW ORLEANS, LOUISIANA.

SELF-REGISTERING SCALE FOR FISHING RODS.

Application filed April 11, 1921. Serial No. 460,407.

*To all whom it may concern:*

Be it known that I, LEONARD A. WAILES, a citizen of the United States, residing at New Orleans, in the parish of Orleans and State of Louisiana, have invented certain new and useful Improvements in a Self-Registering Scale for Fishing Rods; and I do hereby declare the following to be a full, clear, and exact description of the invention, such as will enable others skilled in the art to which it appertains to make and use the same.

The object of the invention is to provide simple and efficient means whereby the strain upon a fishing line due to the weight and resistance of a fish which has been struck can be accurately measured, and furthermore whereby the maximum strain applied thereto may be registered by an indicator which will serve as evidence of the amount of strain upon the line even though the line or the rod or both should fail; and furthermore to provide in this connection a device which can be readily applied to a fishing rod without interfering in any way with the ordinary use thereof; and with this object in view the invention consists in a construction and combination of parts of which an embodiment is shown in the drawing, wherein:

Figure 1 is a view of a registering device embodying the invention applied in the operative position to a fishing rod.

Figure 2 is a longitudinal sectional view of the same.

Fig. 3 is a sectional view taken on the line 3—3 of Fig. 2.

The device consists essentially of a spring balance scale having a casing 10 which is in the form of a split tube having its edges overlapping as indicated at 11. Owing to the overlapping edges, the tube is adapted for mounting on fishing poles or rods of different diameters. As shown the casing is mounted on a fishing rod or pole 12 and clamping rings 13 engage over the end portions of the casing and hold the edges thereof in overlapping relation and lock the device in place on the pole, the follower 14 of the scale of which the movement is resisted by the spring 15, carrying a running hook 16 around which a loop of the fishing line 17 may be engaged after a strike has been made, as a means of throwing the strain of the line upon the scales to cause a movement of the index to show the amount of such strain, the device being adapted for use, if desired, in connection with a reel 19 which is preferably arranged upon the pole or rod above the measuring device.

Mounted in the casing of the scale for traversing the series of graduations 20 is an indicator 21, actuable by and in advance of the scale index, so that when a movement of the index has been caused by a strain on the line engaged with the running hook and the indicator has thereby been advanced with relation to the graduation, the relaxing of the strain or the return movement of the index, due for example to the breaking of the line, will leave the indicator in the adjusted position or in its most advanced position, so as to serve as indication of the resistance offered by the fish which has been struck.

By means of a device of this class, controversies with reference to the weight of fish which have been hooked but which have escaped, may readily be settled without exposing the fisherman to unfair charges or of exaggeration.

Having thus described the invention, what I claim is:—

A fishing rod scale comprising a slit sleeve expansible and contractible to adapt it to be applied to fishing rods of various diameters, rings engaging the ends of said sleeve to hold it against accidental displacement, a member arcuate in cross section secured at its longitudinal edges to the upper side of the sleeve and adapted in conjunction with the sleeve to provide a casing having a longitudinal slot in its upper side, a follower within said casing, a hook carried by said follower and extending through said slot and adapted to have running engagement with a fishing line, a coil spring connected at one end to said follower, blocks closing the ends of said casing, said coil spring connected at its other end to one of said blocks, an indicator within said casing and independent of and in the path of movement of said follower, said indicator having frictional contact with the walls of said casing and adapted to be moved by said follower when the follower is moved by tension applied to a fishing line, said indicator adapted to be left in indicating position when the follower is returned to normal position by said spring, whereby the indicator will indicate the extent of movement of said follower, and said indicator having a portion extending through said slot whereby the position of the indicator is readily ascertainable.

In testimony whereof I affix my signature in presence of two witnesses.

LEONARD A. WAILES.

Witnesses:
C. O. SPERIER,
MARIE SARRADET.